Figure 1:
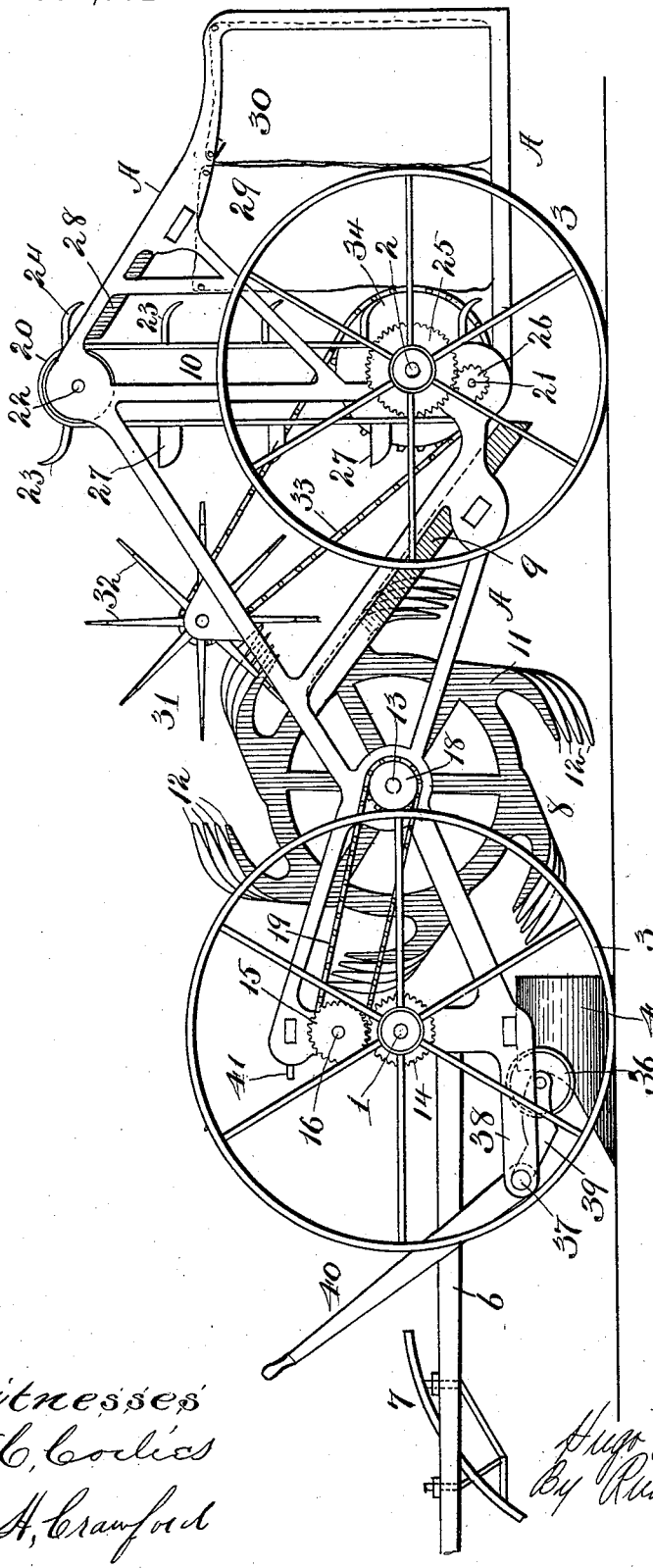

(No Model.)  2 Sheets—Sheet 1.

H. R. KUERSTEN.
POTATO HARVESTER.

No. 588,582. Patented Aug. 24, 1897.

Witnesses
W. C. Coolies
C. H. Crawford

Inventor:
Hugo R. Kuersten
By Rudolph Wm. Lotz
Attorney (No Model.) 2 Sheets—Sheet 2.
H. R. KUERSTEN.
POTATO HARVESTER.
No. 588,582. Patented Aug. 24, 1897.
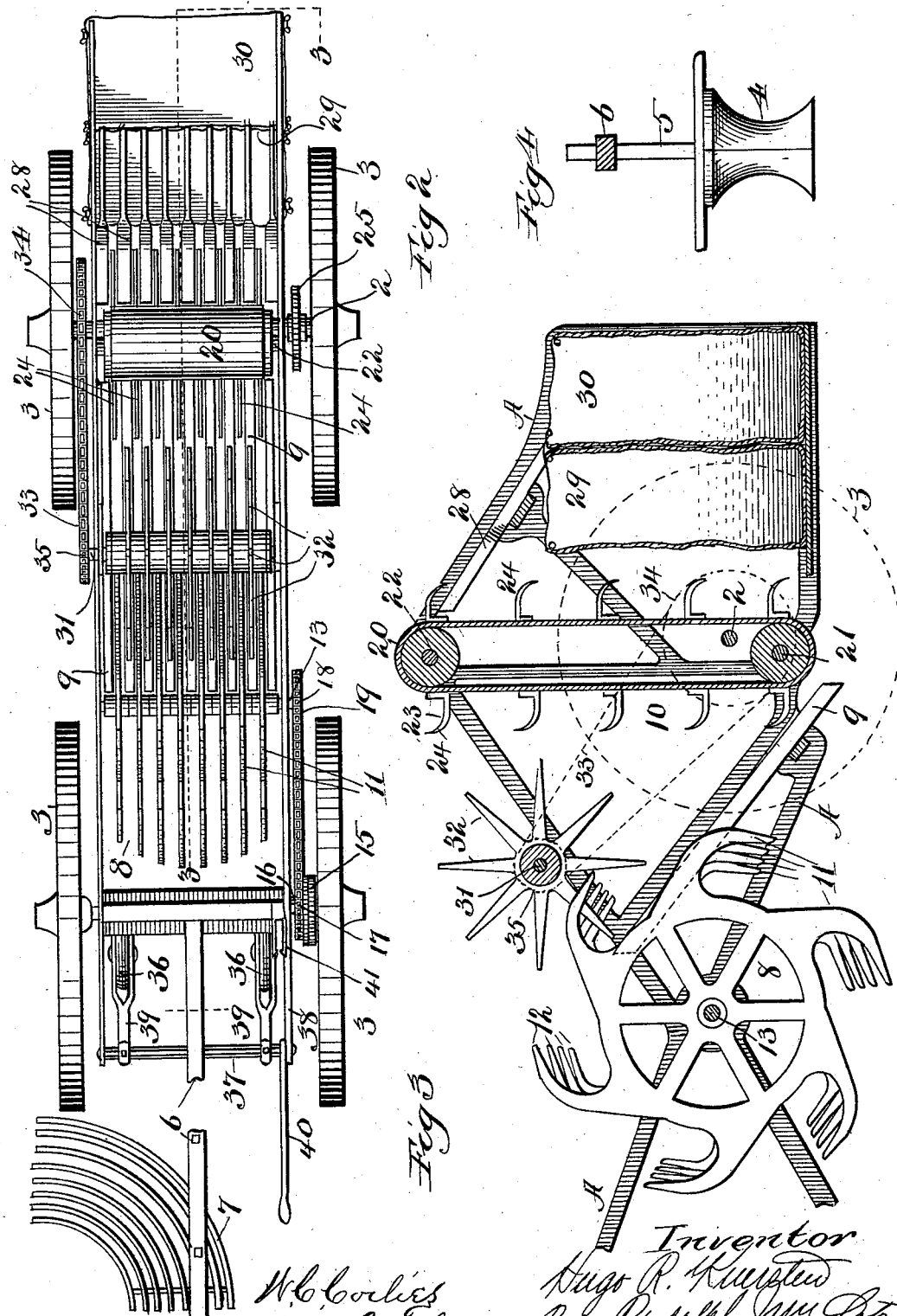

UNITED STATES PATENT OFFICE.

HUGO R. KUERSTEN, OF CHICAGO, ILLINOIS, ASSIGNOR OF ONE-FOURTH TO PAUL PAUSE, OF SAME PLACE.

POTATO-HARVESTER.

SPECIFICATION forming part of Letters Patent No. 588,582, dated August 24, 1897.

Application filed January 27, 1896. Serial No. 576,998. (No model.)

*To all whom it may concern:*

Be it known that I, HUGO R. KUERSTEN, a citizen of the United States, residing at Chicago, in the county of Cook and State of Illinois, have invented certain new and useful Improvements in Potato-Harvesters; and I do hereby declare the following to be a full, clear, and exact description of the invention, such as will enable others skilled in the art to which it appertains to make and use the same.

This invention relates to a novel construction in a potato-harvester, the object being to provide a simple, durable, and efficient machine of this kind which will remove the potato from the ground, clean it, and deliver it into a bag.

My invention consists in the features of construction and combinations of parts hereinafter fully described and claimed.

In the accompanying drawings, illustrating my invention, Figure 1 is a side elevation of a potato-harvester constructed in accordance with my invention. Fig. 2 is a top plan view of the same. Fig. 3 is a central longitudinal section taken on the line 3 3 of Fig. 2. Fig. 4 is a detail front elevation of the plow.

Referring now to said drawings, A indicates the frame of my machine, which is mounted upon axles 1 and 2, journaled therein and provided at their ends with wheels 3. Mounted upon said machine at the front portion thereof is a plow 4, provided with an upwardly-extending shaft 5, which forms a pivot upon which said plow turns. The tongue 6 is secured to said shaft 5 and turns the same so as to keep said plow always in the middle of the furrow. Secured to said tongue 6 is a comb 7, which is adapted to catch the sprout and tear it from the potato.

Pivotally mounted upon the frame of the machine, immediately behind the front wheels thereof, is a revolving fork 8, which is adapted to take the potatoes from the ground after the same have been brought to the surface by said plow 4 and deliver them upon a grate 9, which leads to the elevator 10. The said revolving fork 8 consists of a plurality of disks or wheels 11, provided with outwardly-extending hooks or prongs 12 around their peripheries, the ends of said hooks or prongs being concentric with said peripheries of said disks. Said disks or wheels are mounted upon a shaft 13 at regular intervals, the hooks or prongs thereon increasing in size from the outer to the central disks, so that a line drawn through the ends of the hooks or prongs of all of said disks will form an arc of a circle about ninety degrees in extent. In this manner said revolving fork will be made to conform to the shape of the furrow cut by said plow and catch the potatoes from beneath without digging unnecessarily deeply into the ground. In the drawings I have shown six of said hooks or prongs upon each of said disks and eight of said disks mounted upon said shaft 13, but these numbers may obviously be increased or diminished without departing from the spirit of my invention. Said revolving fork 8 is driven from the axle 1 by means of a cog-wheel 14, mounted thereon and engaging a cog-wheel 15, mounted upon a shaft 16, journaled in the frame of the machine and carrying a sprocket-wheel 17, which is geared to a sprocket-wheel 18 on said shaft 13 by a sprocket-chain 19. During its revolutions said revolving fork picks the potatoes from the ground and carries them upwardly until the beginning of the downward movement of the said hooks or prongs, when they roll down upon the inclined grate 9, between the slats composing which the said hooks or prongs pass. During their passage down said inclined grate any earth which may still adhere to the potatoes is shaken off and drops to the ground. From the lower end of said grate 9 the potatoes are lifted by an elevator 10, consisting of a belt 20, running over rollers mounted upon shafts 21 and 22, mounted in bearings in the frame A adjacent said axle 2 and at the lower and upper portions of said frame, respectively. Secured to said belt 20 at regular intervals are elevator-buckets 23, consisting of a series of prongs 24, adapted to pass through the interstices in said grate 9 and lift the potatoes therefrom. The said elevator 10 is driven from said axle 2 by means of a cog-wheel 25, mounted thereon and engaging a pinion 26 on said shaft 21. The prongs adjacent the edges of said belt are preferably provided with side plates 27 to prevent the potatoes from rolling out at the sides of said buckets. Said elevator 10 raises said potatoes and delivers them upon an inclined grate 28, which is provided with narrow interstices at its upper end just wide enough to permit the passage of said prongs therethrough, said interstices increasing in width below this point. Two bags 29 and 30 are hung upon the frame A in any suitable manner in the rear of said elevator 10, said bag 29 being hung below the portion of the said grate 28 provided with wide interstices to receive the small potatoes dropping through the same, and said bag 30 being hung at the end of said grate 28 to receive the large potatoes rolling from the end thereof. Said bags are removably secured to enable them to be removed and replaced by empty bags as soon as they are filled. Mounted in bearings on said frame A, between said revolving fork 8 and said elevator 10, is a shaft 31, carrying revolving fingers 32, which are adapted to pass between the adjacent prongs of said revolving fork 8 and remove any potatoes or stones which may be caught between the same. Said revolving fingers revolve in an opposite direction from and at a higher speed than said fork 8, being driven by a sprocket-chain 33, running over a sprocket-wheel 34 on said shaft 2 and a sprocket-wheel 35 on said shaft 31. Said axles 1 and 2 are immovably mounted in said frame A, and to turn said machine when the end of a furrow is reached I provide a pair of wheels or casters 36, secured to a shaft 37, pivoted to a forward extension 38 of said frame A by means of downwardly-extending arms or lugs on said shaft, to which the sleeves 39, in the bifurcated ends of which the said wheels 36 are mounted, are pivoted. Said shaft 37 is turned by means of a lever 40, secured thereto, which is adapted to be engaged by any suitable catch 41 when said wheels 36 are at the lower limit of their movement, by which the front wheels 3 are raised from the ground. The action of said wheels 36 is like that of furniture-casters, and thus enables the machine to be turned in any desired direction.

I claim as my invention—

A potato-digger comprising a frame mounted upon wheels held rigidly in alinement with each other, a plow rigidly mounted between the foremost pair of wheels, a supplementary pair of wheels movably mounted in a frame pivoted to said main frame between said foremost wheels and adapted to drop below the tread of said foremost wheels and hold the same and said plow above the level of the ground to turn said digger, a rotary fork adapted to gather the potatoes from the furrow cut by said plow, an inclined grate adapted to receive said potatoes from said fork, a rotary comb situated above said fork and having teeth adapted to pass between the prongs of said fork to clear the same; an elevator adapted to receive said potatoes from said inclined grate, an assorting-grate adapted to receive said potatoes from said elevator, receptacles below said assorting-grate, gearing between said foremost wheels and said rotary fork, and gearing between said rear wheels and said comb and said elevator, to cause said comb to revolve in an opposite direction from said fork and at greater speed.

In testimony whereof I affix my signature in presence of two witnesses.

HUGO R. KUERSTEN.

Witnesses:
RUDOLPH WM. LOTZ,
WM. B. SNOWHOOK.